United States Patent
Hooda et al.

(10) Patent No.: US 12,483,477 B2
(45) Date of Patent: Nov. 25, 2025

(54) CROSS-DOMAIN POLICY ORCHESTRATION

(71) Applicant: Cisco Technology, Inc., San Jose, CA (US)

(72) Inventors: Sanjay Kumar Hooda, Pleasanton, CA (US); Massimiliano Ardica, Valbonne (FR); Darrin Joseph Miller, Marysville, OH (US); Elango Ganesan, San Jose, CA (US); Ian McDowell Campbell, Bow Mar, CO (US); Saravanan Radhakrishnan, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 89 days.

(21) Appl. No.: 18/501,771

(22) Filed: Nov. 3, 2023

(65) Prior Publication Data

US 2025/0150348 A1   May 8, 2025

(51) Int. Cl.
*H04L 41/0894* (2022.01)
*H04L 12/46* (2006.01)
*H04L 41/0893* (2022.01)

(52) U.S. Cl.
CPC ...... *H04L 41/0894* (2022.05); *H04L 12/4641* (2013.01); *H04L 41/0893* (2013.01)

(58) Field of Classification Search
CPC ............. H04L 41/0894; H04L 12/4641; H04L 41/0893
See application file for complete search history.

(56) References Cited

U.S. PATENT DOCUMENTS

| | | | |
|---|---|---|---|
| 9,270,701 B1 | 2/2016 | Lamb et al. | |
| 10,826,775 B1* | 11/2020 | Moreno | H04L 41/0893 |
| 2012/0291089 A1* | 11/2012 | Bomgardner | G06F 21/6236 726/1 |
| 2013/0283338 A1* | 10/2013 | Kumar | H04L 63/20 726/1 |
| 2020/0067779 A1* | 2/2020 | Jost | H04L 41/5006 |
| 2020/0092752 A1* | 3/2020 | Henry | H04W 28/0284 |
| 2020/0409744 A1 | 12/2020 | Lee et al. | |
| 2021/0234898 A1* | 7/2021 | Desai | H04L 63/104 |
| 2021/0377164 A1* | 12/2021 | Sanghvi | H04L 45/42 |
| 2022/0360484 A1 | 11/2022 | Yadav et al. | |

\* cited by examiner

*Primary Examiner* — Johnny B Aguiar
(74) *Attorney, Agent, or Firm* — Lee & Hayes, P.C.

(57) ABSTRACT

A method of cross-domain policy orchestration may include executing, with a cross-domain automation (CDA) controller, a macro-segmentation of a plurality of domains based at least in part on metadata defining a mapping to a corresponding plurality of domain controllers, and executing, with the CDA controller, a micro-segmentation of policies within a group based at least in part on a merged policy matrix obtained from policies of the domain controllers.

20 Claims, 8 Drawing Sheets

300

CROSS-DOMAIN POLICY ORCHESTRATION

TECHNICAL FIELD

The present disclosure relates generally to computer networking. Specifically, the present disclosure relates to systems and methods for providing cross-domain policy orchestration for a plurality of domains to achieve both interworking of the domains and policy independence between the domains. The present disclosure relates generally to performing a macro-segmentation of domains within a computing environment and a micro-segmentation of group-based policies with each of the domains.

BACKGROUND

Computing networks or environments may include a plurality of different domains. Each of these domains may include different policies. These different policies among the domains may create a situation where interworking communications between the different domains may prove difficult. One method of ensuring interworking between the domains may be to ensure common policies are enforced at each of the domains. However, this creates a situation where some of the domains may allow for too restrictive or too unrestrictive of policies and may be void of policy independence between the domains and the endpoints within a number of virtual local area networks (VLANs).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
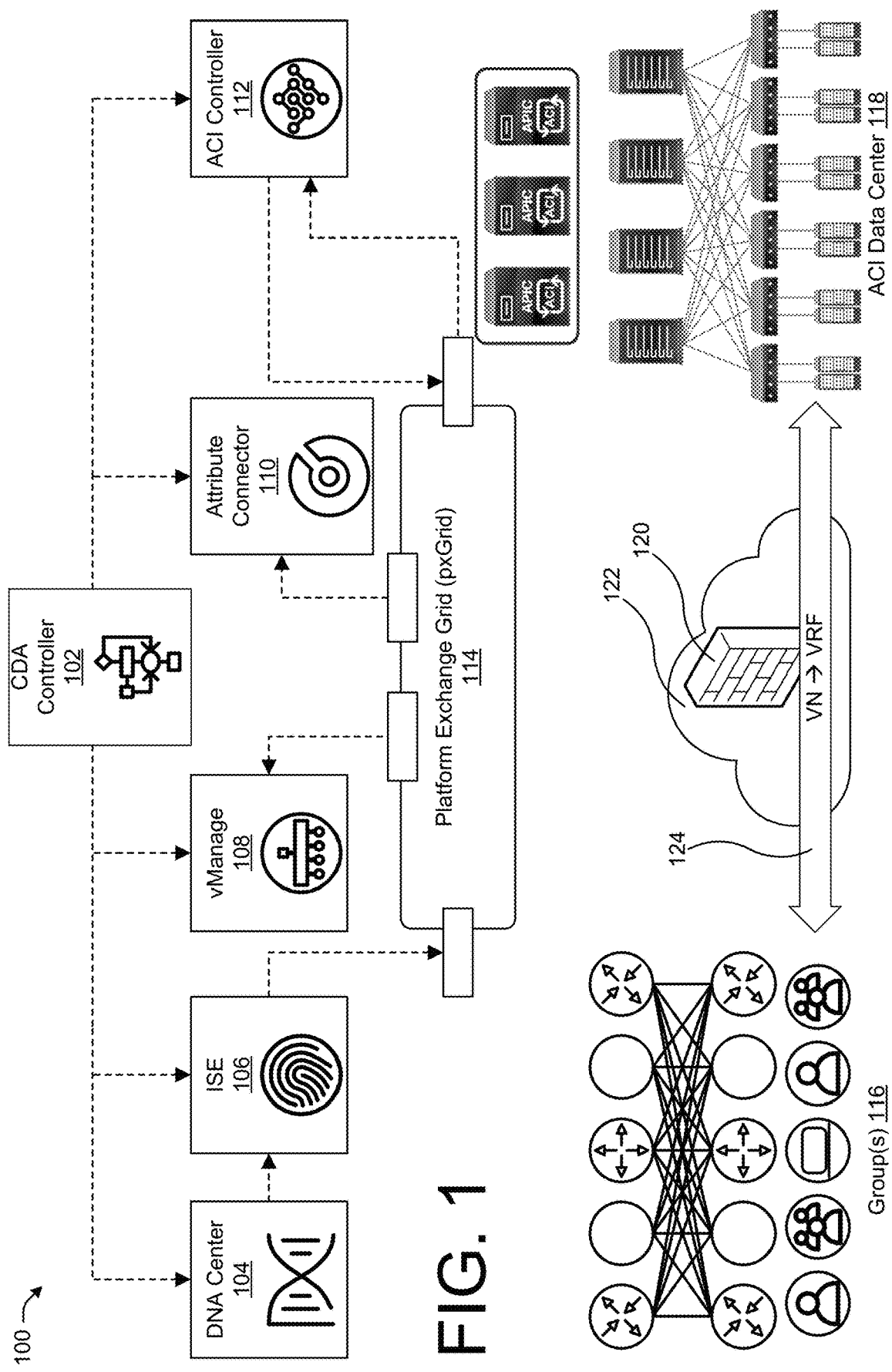
FIG. 1 illustrates a system-architecture diagram of a network that utilizes a cross-domain automation (CDA) controller for cross-domain policy orchestration, according to an example of the principles described herein.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In one example, structures and components are shown in block diagram form in order to avoid obscuring the concepts of the subject matter of this disclosure.

OVERVIEW

The present systems and methods describe provide for cross-domain policy orchestration. The methods may include executing, with a cross-domain automation (CDA) controller, a macro-segmentation of a plurality of domains based at least in part on metadata defining a mapping to a corresponding plurality of domain controllers, and executing, with the CDA controller, a micro-segmentation of policies within a group based at least in part on a merged policy matrix obtained from policies of the domain controllers.

Example Embodiments

As mentioned above, there may be inflexible solutions to cross-domain orchestration that require translations across domains but many of these solutions may suffer from a lack of an ability to create inherent dependencies across domains and an inflexibility of these solutions to adapt to various uses cases that customers encounter within their respective networks and information technology (IT) infrastructures. For example, some administrators may directly connect their data center (DC) to a campus network (e.g., DC-to-campus), while other administrators may use a wide-area network (WAN) to connect DC-to-Campus, while other administrators may place a firewall in between the multiple domains. A network may provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations. Some of the unique challenges a network may face include applying policies to a plurality of domains within the network, providing for differing policies for each of those domains, integrating wired and wireless devices, on-boarding computing devices and things that can appear anywhere in the network and maintaining connectivity when the devices and things migrate from location to location within the network, supporting bring your own device (BYOD) capabilities, connecting and powering Internet-of-Things (IoT) devices, and securing the network despite the vulnerabilities associated with Wi-Fi access, device mobility, BYOD, and IoT. Approaches for deploying a network capable of providing these functions may require constant and extensive configuration and administration by highly skilled network engineers operating several different systems (e.g., directory-based identity services; authentication, authorization, and accounting (AAA) services; wireless local area network (WLAN) controllers; command line interfaces for each switch, router, or other network device of the network; etc.) and manually stitching these systems together. This can make network deployment and policy enforcement difficult and time-consuming.

Network administrators may use policies to regulate traffic across networking domains within an overall network. However, orchestrating policies across distinct networking domains may pose a problem, as networks may have different policies and/or policy protocols. The systems and methods disclosed herein aim to provide a solution to this need in the art.

With respect to data centers for a software defined access (SDA) campus and an application centric infrastructure (ACI), for example, the SDA campus and the ACI data centers may be disjointed policy domains. In other words, each of the multiple domains may have respective policy groups, endpoint identities, and/or contracts, potentially based on a shared or similar underling technology and/or network underlay. Further, additional disjointed policy domains may be integrated into the SDA campus and ACI data centers such as, for example, a software defined wide area network (SD-WAN), etc., and so on. Although a an SDA campus is described herein in connection with the present systems and methods, multi-campus scenarios may also apply the present systems and methods to SDA and/or non-SDA domains.

Thus, learning from the above-described inflexible solutions to cross-domain orchestration, this disclosure removes the inherent dependencies across multiple domains and, instead, provides for a solution that works for known and unknown use cases by utilizing independent matrices and/or combining matrices based on network characteristics. This disclosure describes systems and methods for obtaining cross-domain policy orchestration between a plurality of domains. These systems and methods provides for policy independence between domains and the ability of an administrator to visualize the policies in a common manner and flexibly adjust any number of the policies throughout the domains. Some customers of IT infrastructures may desire to include a plurality of separate domains within, for example, a controller-based network architecture. This disclosure provides for independent policies to be implemented across multiple domains while allowing for a common policy among the multiple domains whenever necessary. Further, this disclosure provides a means by which an administrator (or other user) may visualize both independent policies and common policies throughout the controller-based network architecture in order to provide perspective to the administrator.

This disclosure provides different policies across the multiple domains and provides for the ability to split a relevant policy to different domains. This may be applicable in situations where a combined policy has been defined and does not require an individual domain controller change the policy. This disclosure also describes an ability to obtain policies from individual domain controllers and present the policies in a consistent manner to an administrator via a user interface (UI)/user experience (UE) presented by, for example, a cross-domain automation (CDA) controller (sometimes referred to as cross-domain workflow (CDW) controller). Thus, the present disclosure provides for cross-domain interworking and policy orchestration as well as allowing for full integration of the policies as an IT infrastructure evolves.

Additionally, the techniques described herein may be performed by a system and/or device having non-transitory computer-readable media storing computer-executable instructions that, when executed by one or more processors, performs the method described above.

Examples described herein provide a method of cross-domain policy orchestration. The method may include executing, with a cross-domain automation (CDA) controller, a macro-segmentation of a plurality of domains based at least in part on metadata defining a mapping to a corresponding plurality of domain controllers, and executing, with the CDA controller, a micro-segmentation of policies within a group based at least in part on a merged policy matrix obtained from policies of the domain controllers.

Executing the macro-segmentation may include connecting the CDA controller to a plurality of domain controllers and updating a domain-specific database table associated with the CDA controller to include data defining virtual networks (VNs) associated with the domain controllers. Executing the macro-segmentation may further include presenting, via a user interface, a mapping for each of the VNs for the domain controllers, and transmitting metadata defining the mapping to the domain controllers.

Executing the macro-segmentation may further include instantiating a connection between a domain and a computing device associated with a group based on the metadata defining the mapping. Transmitting the metadata defining the mapping to the domain controllers may include transmitting a virtual local area network (VLAN) identification (ID) to the domain controllers.

Executing the micro-segmentation may include, with the CDA controller, creating local policy matrices based on policies received from each of the domain controllers, generating a merged policy matrix based on the local policy matrix and the policies received from the domain controllers, and transmitting to the domain controllers split policy matrices defining updated policies based at least in part on receiving, via a user interface, a change to the policies. In one example, the merged policy matrix may be generated based at least in part on the groups being normalized across the domains or the mapping of the groups is provided by an administrator. Further, in one example, the policies received from the domain controllers are obtained from remote policy matrices of the domain controllers. Executing the micro-segmentation may further include, splitting the merged policy matrix into the split policy matrices based on the change to the policies and the domain associated with the changed policies.

Examples described herein also provide a non-transitory computer-readable medium storing instructions that, when executed, causes a processor to perform operations. The operations may include executing, with a cross-domain automation (CDA) controller, a macro-segmentation of a plurality of domains based at least in part on metadata defining a mapping to a corresponding plurality of domain controllers, and executing, with the CDA controller, a micro-segmentation of policies within a group based at least in part on a merged policy matrix obtained from policies of the domain controllers.

The operations regarding executing the macro-segmentation may include connecting the CDA controller to a plurality of domain controllers, and updating a domain-specific database table associated with the CDA controller to include data defining virtual networks (VNs) associated with the domain controllers. The operations regarding executing the macro-segmentation may further include presenting, via a user interface, a mapping for each of the VNs for the domain controllers and transmitting metadata defining the mapping to the domain controllers. The operations may further include instantiating a connection between a domain and a computing device associated with a group based on the metadata defining the mapping. The transmitting of the metadata defining the mapping to the domain controllers comprises transmitting a virtual local area network (VLAN) identification (ID) to the domain controllers.

The operations regarding executing the micro-segmentation may include with the CDA controller, creating local policy matrices based on policies received from each of the domain controllers, generating a merged policy matrix based on the local policy matrix and the policies received from the domain controllers, and transmitting to the domain controllers, split policy matrices defining updated policies based at least in part on receiving, via a user interface, a change to the policies. The operations may further include splitting the merged policy matrix into the split policy matrices based on the change to the policies and the domain associated with the changed policies. The policies received from the domain controllers may be obtained from remote policy matrices of the domain controllers.

Examples described herein also provide a cross-domain automation (CDA) controller including a processor and a non-transitory computer-readable media storing instructions that, when executed by the processor, causes the processor to perform operations. The operations may include executing a macro-segmentation of a plurality of domains based at least in part on metadata defining a mapping to a corresponding plurality of domain controllers, and executing a micro-segmentation of policies within a group based at least in part on a merged policy matrix obtained from policies of the domain controllers.

The operations of executing the macro-segmentation may include connecting to a plurality of domain controllers and updating a domain-specific database table associated with the CDA controller to include data defining virtual networks (VNs) associated with the domain controllers. The operations of executing the macro-segmentation may further include presenting, via a user interface, a mapping for each of the VNs for the domain controllers, transmitting metadata defining the mapping to the domain controllers, and instantiating a connection between a domain and a computing device associated with a group based on the metadata defining the mapping. Transmitting the metadata defining the mapping to the domain controllers comprises transmitting a virtual local area network (VLAN) identification (ID) to the domain controllers.

The operations of executing the micro-segmentation may include creating local policy matrices based on policies received from each of the domain controllers and generating a merged policy matrix based on the local policy matrix and the policies received from the domain controllers. The operations of executing the micro-segmentation may further include splitting the merged policy matrix into the split policy matrices based on the change to the policies and the domain associated with the changed policies, and transmitting to the domain controllers split policy matrices defining updated policies based at least in part on receiving, via a user interface, a change to the policies. The policies received from the domain controllers may be obtained from remote policy matrices of the domain controllers.

Additionally, the techniques described in this disclosure may be performed as a method and/or by a system having non-transitory computer-readable media storing computer-executable instructions that, when executed by one or more processors, performs the techniques described above.

This disclosure describes techniques for retaining the layout of a network or IT infrastructure but allowing for an ability to have a common policy across the domains within the IT infrastructure and/or a different policy in each of the domains within the IT infrastructure. In both of the above use cases of obtaining a common policy and/or the different polices among the domains, the present disclosure provides for seamlessly shifting from one method of operation to another method without any strains on the IT infrastructure or the operation thereof. The ability to seamlessly shift between the methods of operation allows an administrator to visualize what information will be sent to a particular domain controller. Still further, the present systems and methods provides unique abilities to merge, split, and visualize the policies on a need basis.

The techniques described herein provide a CDA controller that provides cross domain policies including connectivity policies as well as group-based policies to be supported in cases when the domains are distinct as well as when the domains may be represented by common constructs. The techniques also provide for the creation of a common matrix. Creation of the common matrix may include finding dynamic holes in the scalable group tag (SGT) space so that the collision across individual domain controllers is accounted for and avoided. In situations where an administrator desires to scale the present solutions, the aspect of a many-to-1 representation of group space in a domain to a collective group in another domain may be represented by a single group tag and vice versa.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of a network 100 that utilizes a CDA controller 102 (sometimes referred to as cross-domain workflow (CDW) controller) for cross-domain policy orchestration, according to an example of the principles described herein. The CDA controller 102 may include any combination of hardware and/or software that is used to execute a macro-segmentation of a plurality of domains based at least in part on metadata defining a mapping to a corresponding plurality of domain controllers. The CDA controller 102 may further be used to execute a micro-segmentation of policies within a group based at least in part on a merged policy matrix obtained from policies of the domain controllers. The macro-segmentation process and micro-segmentation process performed by the CDA controller 102 described herein serve to provide solutions to both connectivity policies (e.g., policies associated with the virtual network (VN)/virtual routing and forwarding (VRF)) and group-based policies within each of a plurality of domains communicatively coupled to and administrated by the CDA controller 102. As a user or groups of users seek to connect to the network 100, they may often connect via multiple different networks or domains to access various resources within the network 100. For example, a user or groups of users may seek to connect to a date center (DC) to gain access to a first application, connecting into a cloud network to gain access to a second application, utilizing a wide area network (WAN) and/or a software-defined wide area network (SD-WAN) component, utilizing other domains within the network 100, and combinations thereof. Various policies regarding access to these various domains may be placed to ensure that only certain users may access certain domains and the resources included within those domains. For example, a user included within an engineering group within an organization may not be allowed to access applications and data associated with human resources, so the network 100 may restrict such access in a per-domain basis. Thus, the CDA controller 102 may define for each domain in a mapping of what policies should be enforced for that domain.

The network 100 may include a plurality of controllers used to control various functions of the network. For example, the controllers may include a network controller and/or management dashboard such as the DNA Center 104 developed and distributed by Cisco® that may be used to identify and classify endpoint devices within the campus domain, the WAN/SD-WAN domain, the security domain, the DC domain, a cloud domain, and other domains. Further, the controllers may include an identity-based network access control and policy enforcement system such as the identity services engine (ISE) 106 developed and distributed by Cisco® that functions as a common policy engine that enables endpoint access control and network device administration for an enterprise utilizing the network 100. Still further, the controllers may include a network orchestrator or network management appliance such as the vManage 108 developed and distributed by Cisco® that functions to provision manage the WAN/SD-WAN domains deployed within the network 100. Even still further, the controllers may include an attribute connector 110 such as the Cisco Secure Dynamic Attribute Connector (CSDAC) developed and distributed by Cisco® that functions as an interface that imports attribute maps from a dynamic environment and reliably utilizes these dynamic feeds to enforce access policies without requiring policy deployment. Further, the controllers may also include an application-centric infrastructure (ACI) controller 112 such as the Nexus dashboard orchestrator (NDO) developed and distributed by Cisco® that functions to support an application policy infrastructure controller (APIC) cluster and an ACI data center 118. The NDO of the ACI controller 112 may assist the ACI controller 112 as an inter-site policy manager. The APIC cluster may assist the ACI controller 112 as a unified point of automation and management for an ACI fabric associated with the ACI controller 112 and the ACI data center 118.

The network 100 may further include a cross-network messaging and validation system incorporated into the design of the network 130. One such system might be Cisco® PxGrid 114, a single protocol system, developed and distributed by Cisco®. Cisco® PxGrid 114 enables multi-vendor, cross-platform network system collaboration among parts of the IT infrastructure of the network 100 such as security monitoring and detection systems, network policy platforms, asset and configuration management, identity and access management platforms, and virtually any other IT operations platform. Cisco® PxGrid 114 enables, when operational needs arise, participants in the network 100 to share information with platforms using Cisco® PxGrid 114.

The multi-domain deployment within the network 100 may include any number of separate domain controllers with differing policies associated with each of the domains. For example, the different domains may include a campus domain, a WAN and/or SD-WAN domain, a security domain, a data center (DC) domain, other domains, and combinations thereof. In one example, a plurality of controllers may be utilized to provide access to one or more of these domains. For example, a network controller and/or management dashboard such as the Cisco® DNA Center 104 may be used to identify and classify endpoint devices within the campus domain, the WAN domain, the security domain, the DC domain, and other domains. The endpoint devices within the campus domain may include networked device such as, for example, a computing device, a workstation, a desktop computer, a laptop computer, a tablet computing device, a network appliance, an e-reader, a smartphone, a server computing device, a router, a switch, an edge device, a hub, a bridge, a gateway, a modem, a repeater, an access point, other types of computing devices, and combinations thereof. These endpoint devices may be grouped in at least one of the groups 116 within the campus domain as depicted in FIG. 1. Although one group 116 is depicted in FIG. 1, any number of groups 116 may be included in the network 100.

As mentioned above, the CDA controller 102 assists in the macro-segmentation of traffic throughout the network 100. Macro-segmentation segments traffic between domain A and domain B. The policy mapping within the macro-segmentation provides a user within a first VLAN in a first domain access to a second VLAN in a second domain via a secure segment without allowing the user to interact with other users in that communication channel. The CDA controller 102 may map a gateway on the first domain to a gateway of the second domain. Thus, the policy mapping in this macro-segmentation is a mapping of how two separate domains may communicate at the network level. Further, this policy mapping may define the enforcement of policies at both the domains once the user is allowed access to the second VLAN in the second domain. In one example, the CDA controller 102 may load policy groups and SGT mappings from the ISE 106.

Segmentation may include creating boundaries between systems or groups of systems. Using certain constructs, the CDA controller 102 may control whether a first system (e.g., system A) can communicate with a second system (e.g., system B). This scenario allows for the ability to separate out departments within an organization such as a corporation and allows for the control of which systems and end devices (e.g., individual computing devices within eh groups 1116) may communicate with one another. The constructs that may be used in SD-Access may include virtual routing and forwarding (VRF) instances or, in SD-Access terms, virtual networks (VNs) and security group tags (SGTs) (sometimes referred to as scalable group tags (SGTs).

In SD-Access, VNs may be utilized as a form of macro-segmentation and SGTs may be utilized as a form of micro-segmentation. A major boundary between groups using VNs may be created and used to further control communication between different endpoints in the same group (e.g., the VN) using SGTs. Hence, the terms used herein for "macro" and "micro" may be used to describe the major boundaries created via the CDA controller 102. In an example of an SD-Access fabric, locator/ID separation protocol (LISP) may be used to provide control plane forwarding information. For traffic going external to the fabric, a border node may be used to directly map the VN to VRF instance 124 and may isolate communication between them by using separate routing table per VRF.

In one example, the DNA center 104 may have a single virtual network called DEFAULT_VN and all endpoints may belong to this default virtual network. Once the ISE 106 is integrated to the DNA center 104, the default VN (e.g., DEFAULT_VN) may then be populated with scalable groups from the ISE 106. The scalable groups may be used in the DEFAULT_VN or, in one example, a new virtual network may be defined.

SGTs may include a 16-bit group identifier which is associated with scalable groups including those computing devices included within the groups 116 within the campus domain. The scalable groups may be formed as groups based at least on part on a business requirement similarity between the computing devices, a similarity in functions of the devices, a similarity in object type among the devices, other categorization methods, and combinations thereof. In one example, a large number of predefined scalable groups along with associated hexadecimal tag IDs may be included. The DNA center 104 may be used to define SGTs and map the virtual network based on organization requirement.

As described herein, in SD-Access, segmentation may be performed by two methods with the assistance of the VN of the VN to VRF instance 124 and SGTs including the macro-segmentation and the micro-segmentation described herein. In one example, the endpoints such as the computing devices within the group(s) 116 within the VN are able to communicate with each other and achieving micro-segmentation with in VN will prevent the endpoints from communicating with each other. In contrast, macro-segmentation methods may cause the endpoints not being able to communicate with each other via different VNs. As each VN has its own routing instance, an external (e.g., a Layer 3), non-fabric device such as a firewall 120 within a separate network such as a cloud network 122 may be used to provide inter-VRF forwarding necessary for communication between different VNs. At this firewall 120, VN policy(ies) may be generated for communication between VNs. Further, domain policy(ies) may be defined at the various domains such as, for example, a campus domain, a WAN domain, a security domain, a DC (e.g., APIC) domain, a cloud domain, etc. associated with the DNA center 104, the ISE 106, the orchestrator 108, the attribute collector 110, the ACI controller 112, and other network devices. The domain policies may be enforced for traffic within the VNs based on the SGTs. The VN policy(ies) and/or the domain policy(ies) may be configured on the CDA controller 102 and/or the DNA center 104 and may be transmitted to the ISE 106 via a REST API. The ISE 106 may update the VN policy(ies) and/or the domain policy(ies) to edge nodes only whose SGTs are associated with attached device. In one example, enforcement of the VN policy(ies) and/or the domain policy(ies) may occur at egress where the destination is attached.

In the network 100 described herein, the CDA controller 102 may include a processor and a non-transitory computer-readable media storing instructions that, when executed by the processor, causes the processor to perform operations associated with the macro-segmentation and the micro-segmentation of the network 100 as described herein. The operations may include executing a macro-segmentation of the domains based at least in part on metadata defining a mapping to a corresponding plurality of domain controllers (e.g., controllers associated with a campus domain, a WAN domain, a security domain, a DC (e.g., APIC) domain, a cloud domain, etc.) associated with the CDA controller 102.

Further, the operations may include executing a micro-segmentation of policies within the group 116 based at least in part on a merged policy matrix obtained by the CDA controller 102 from policies of the domain controllers.

More specifically, the operations associated with the macro-segmentation may include connecting the CDA controller 102 to a plurality of domain controllers (e.g., the DNA center 104, the ISE 106, the orchestrator 108, the attribute collector 110, the ACI controller 112, and other devices or controllers within the network 100 that are coupled to the CDA controller 102). The CDA controller 102 may utilize a UI/UX associated with the CDA controller 102 to provide a mapping option for each of the VNs across different domain controllers. For a campus domain, a WAN/SD-WAN domain, and an ACI domain for the default VN (e.g., DEFAULT_VN) in the campus domain may be described as follows where "VN1" is the default VN (e.g., DEFAULT_VN) In this example, an administrator is seeking to utilize the UI/UX to create a communication instance between a WAN domain and an ACI domain (e.g., a data center domain). Thus:

VN1{Campus: VN1; WAN: VNID-50}; {WAN: VNID-50, ACI: CorpA-Employees;} ... }

This further results in creation of per-domain mappings with an example for a WAN domain with a virtual extensible local area network instance identification (VNID) presented below. In the following example, the VNID is "VNID-50," and a mapped ACI domain (e.g., DC domain) is as follows:

VNID-50 {{Campus:VN1; WAN:VNID-50}; {WAN:VNID-50, ACI:CorpA-Employees;}... }
for the ACI domain (e.g., a data center domain):
CorpA-Employees {{Campus:VN1; WAN:VNID-50}; {WAN:VNID-50, ACI:CorpA-Employees;} ... }

Thus, the default VN (e.g., DEFAULT_VN) (e.g., VN1 in this example) may serve as a key to mapping the different VNs across the domains.

In executing the macro-segmentation process, a domain-specific database table associated with the CDA controller may be updated to include data defining VNs associated with the domain controllers. The CDA controller 102 may present, via a user interface, a mapping for each of the VNs for the domain controllers. Further, the CDA controller 102 may transmit metadata defining the mapping to the domain controllers and instantiate a connection between a domain and a computing device associated with a group based on the metadata defining the mapping. Transmitting the metadata defining the mapping to the domain controllers by the CDA controller 102 may include transmitting a virtual local area network (VLAN) identification (ID) (VLAN-ID) to the domain controllers. In one example, the administrator may enter policy mappings for the ACI data center 116 and other domains described herein. This provides flexibility and control to the administrators of the network 100.

As to the transmission of the metadata defining the mapping to the domain controllers such as, the controllers of the campus domain, the WAN domain, the security domain, the DC (e.g., APIC) domain, the cloud domain, etc. (e.g., the DNA center 104, the ISE 106, the orchestrator 108, the attribute collector 110, the ACI controller 112, and other devices or controllers within the network 100) associated with the CDA controller 102, the CDA controller 102 may transmit the metadata information about the VNs to the domain controllers. In one example, the CDA controller 102 may provision both policies and mappings to the domain controllers. For example, the CDA controller 102 may transmit the VLAN-ID along with the pairing for the domain described in the above example. An example of the transmission of the metadata information is a follows:

```
To the campus controller:
VNI {{VLAN50 {Campus:VN1; WAN:VNID-50}}; } ... }
To the WAN controller:
VNID-50 {{VLAN50  {Campus:VN1;  WAN:VNID-50}};  {VLAN20  {WAN:VNID-50,
    ACI:CorpA-Employees}}}
```

It may be noted here that the primary-key changes may be based on the controller associated with the initial domain (e.g., the campus domain in the above example). This allows the receiving controller of the receiving domain (e.g., the ACI domain in the above example) make sense of the received information from the CDA controller 102. This macro-segmentation defines how a computing device or endpoint is able to communicate at the network level, and this policy mapping provided via the macro-segmentation is performed in order to map a gateway in a first domain with a gateway in a second domain and through what VLANs such communication takes place. Further, the above macro-segmentation defines what enforcement of policies is executed once communication at the network level is achieved.

Once the metadata is received by each of the domain controllers as transmitted by the CDA controller 102, each of the domain controllers now knows the information required to connect to another, peer domain. In one example, a network administrator may utilize this metadata to instantiate appropriate connections independent of other domains. More details regarding the macro-segmentation are described herein.

The CDA controller 102 may execute the micro-segmentation by creating local policy matrices based on policies received from each of the domain controllers. The CDA controller 102 may generate a merged policy matrix based on the local policy matrix and the policies received from the domain controllers. Further, in one example, the merged policy matrix may be generated based at least in part on the groups being normalized across the domains and/or the mapping of the groups being provided by an administrator. Further, the merged policy matrix may be split into the split policy matrices based on the change to the policies and the domain associated with the changed policies. The CDA controller 102 may transmit to the domain controllers the split policy matrices defining updated policies based at least in part on receiving, via the user interface, a change to the policies. In one example, the policies received from the domain controllers may be obtained from remote policy matrices of the domain controllers.

Figure 2:
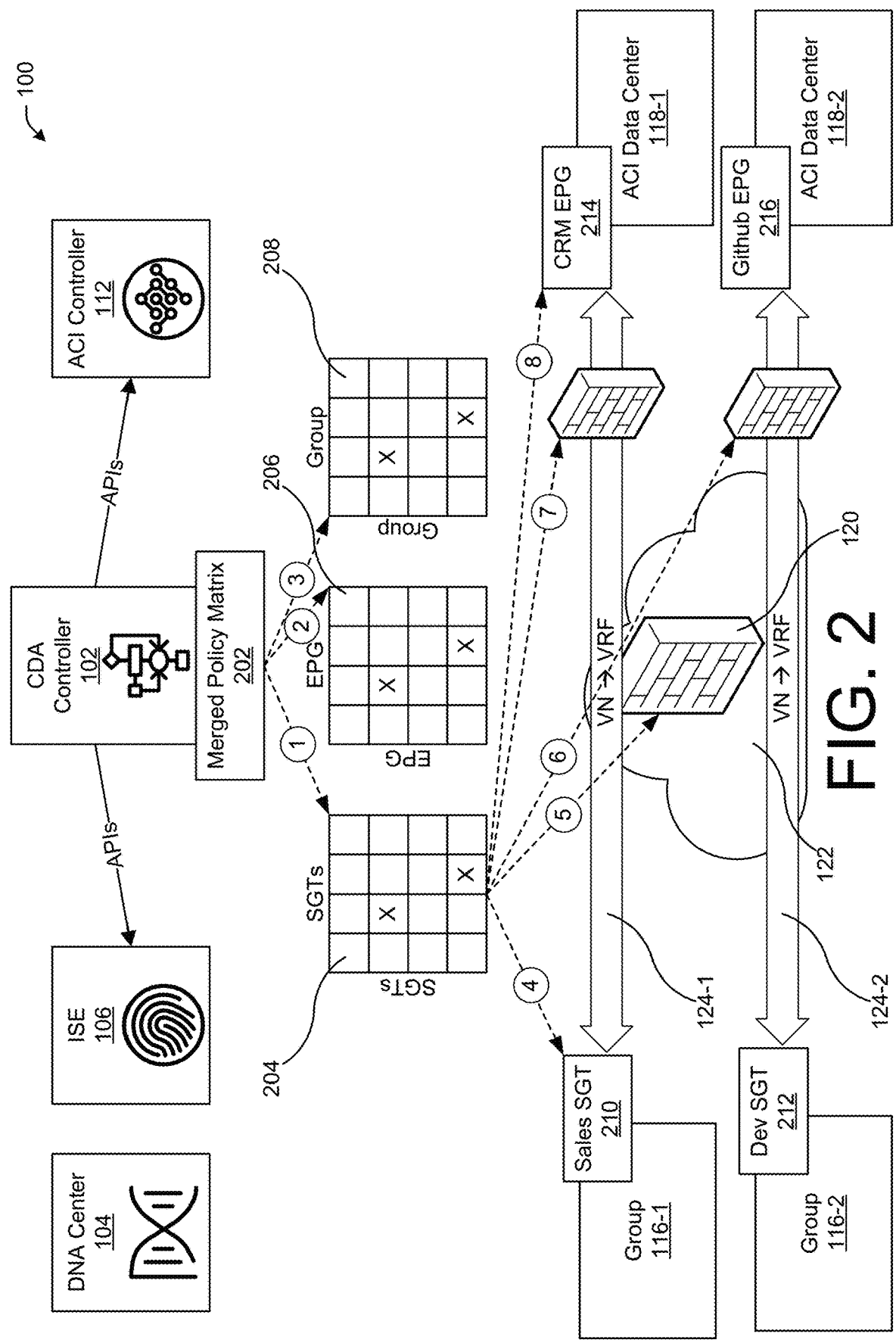
FIG. 2 illustrates a system-architecture diagram of the network of FIG. 1 including a merged policy matrix and split policy matrices, according to an example of the principles described herein.

FIG. 2 illustrates a system-architecture diagram of the network of FIG. 1 including a merged policy matrix and split policy matrices, according to an example of the principles described herein. An example of the above systems and methods may be understood by way of the example provided below in Table 1.

TABLE 1

CDA Cross Domain Policy Provisioning UX

| ISE | DNAC | APIC | vManage | SBG |
|---|---|---|---|---|
| Sales Group | SGT-1 | EPG-2 | Future Domain | Future Domain |
| Dev Group | SGT-2 | EPG-3 | Future Domain | Future Domain |

In this example, a group of computing devices numbered among the group(s) 116 may include designations given by the ISE controller 106 such as a "sales group" designating a sales group of individuals within an organization (e.g., computing devices coupled to the network 100) and a "dev group" designating a software development group of individuals within the organization. The sales group may have a scalable group tag-to-endpoint group (SGT-to-EPG) mapping between the DNA center 104 and the ACI data center 118 (e.g., APIC as designated in Table 1) including a scalable group tag identification (SGT-ID) of "SGT-1" that is mapped to an EPG identification (EPG-ID) of the "EPG-2." Similarly, the dev group may have an SGT-to-EPG mapping between the DNA center 104 and the ACI data center 118 may include the SGT-ID of "SGT-2" that is mapped to an EPG-ID of the "EPG-3."

Endpoint groups (EPGs) may include any managed object that is a named logical entity that contains a collection of endpoints. Endpoints may include any computing device within the network 100 and may have an address (e.g., an identity), a location, attributes (e.g., version or patch level), and may be a physical device or a virtual device. Knowing the address of an endpoint also enables access to all its other identity details. EPGs are fully decoupled from the physical and logical topology. Endpoint examples include servers, virtual machines, network-attached storage, or clients on the Internet. Endpoint membership in an EPG may be dynamic or static. An ACI fabric may contain various types of EPGs including, for example, an application endpoint group (fvAEPg), a layer 2 (L2) external outside network instance endpoint group (l2extInstP), a layer 3 (L3) external outside network instance endpoint group (l3extInstP), management endpoint groups for out-of-band (mgmtOoB) or in-band (mgmtInB) access, among other types. EPGs contain endpoints that have common policy requirements such as security, virtual machine mobility (VMM), quality of service (QOS), or Layer 4 (L4) to Layer 7 (L7) services. Rather than configure and manage endpoints individually, the endpoints may be placed in an EPG and ay be managed as a group. Policies apply to EPGs and never to individual endpoints. Further, an EPG may be statically configured by an administrator in an APIC, or dynamically configured by an automated system. Thus, the EPGs may include devices that are particular to a specific sub-organization or group within an organization for which the network 100 is deployed. For example, a first EPG may include human resources (HR) servers for use by a group of HR personnel within an HR sub-organization of the overall organization. Similarly, in this example, a second EPG may include finance servers for use by a group of finance personnel within a finance sub-organization of the overall organization. Any number of EPGs may be generated to accommodate for any number of sub-organizations or groups within the organization.

It may be noted in Table 1 that future domains such as, for example, the network orchestrator or network management appliance such as the vManage 108 and a network security orchestrator such as the security business group (SBG) security services developed and distributed by Cisco® may be included within Table 1. In this example, the UI/UX presented to an administrator by the CDA controller 102 may display Table 1 including the "future domains" to indicate to the administrator that those domains are not yet communicatively coupled to the DNA center 104 and the ACI data center 118.

As mentioned above, the network 100 may further proceed through a micro-segmentation process applied to policies within group(s) 116 based at least in part on a merged policy matrix 202 obtained from policies of the domain controllers. The CDA controller 102 may connect to and request policies from the domain controllers and create a local policy matrix or local policy matrices based on policies received from each of the domain controllers. In one example, the policies received from the domain controllers may be obtained from remote policy matrices of the domain controllers. Further, in one example, an application program interface (API) may be used to collect the policies from the domain controllers. The CDA controller 102 may generate the merged policy matrix 202 based on the local policy matrices and the policies received from the domain controllers. Generation of the merged policy matrix 202 may require finding dynamic holes in the SGT space of the domains so that the collision across the domain controller may be accounted for and avoided.

Still further, in one example, the merged policy matrix 202 may be generated based at least in part on the groups being normalized across the domains and/or the mapping of the groups being provided by the administrator. Further, when the groups are normalized, the CDA controller 102 and other elements within the network 100 may allow the administrator to ignore the merged policy matrix 202 and directly work on individual matrices coming from the individual domain controllers. Further, in one example, creation of the merged policy matrix 202 in situations where an administrator desires to scale the solution, the aspect of many-to-1 representation of group space in a domain to a "collective-group" in another domain (e.g., an SGT range of 100-200 in the DC domain) may be represented by a single group-tag (e.g., a group tag of "10200" in the campus domain) and vice versa.

As designated by numbers "1," "2," and "3" in FIG. 2, the merged policy matrix 202 may be split into at least two split policy matrices. In one example, the split policy matrices may include an SGT policy matrix 204, an EPG policy matrix 206, and a group policy matrix 208. The SGT policy matrix 204, EPG policy matrix 206, and group policy matrix 208 may define updated policies based at least in part on receiving, via the UI/UX presented by the CDA controller 102, a change to the policies by, for example, administrator.

As indicated by numbers "4," "5," "6," "7," and "8" in FIG. 2, the CDA controller 102 may transmit to the domain controllers, split policy matrices (e.g., the SGT policy matrix 204, the EPG policy matrix 206, and the group policy matrix 208) as necessary. Further, the In one example, splitting the merged policy matrix 202 into the split policy matrices (e.g., the SGT policy matrix 204, an EPG policy matrix 206, and a group policy matrix 208) may be based on the change to the policies and the domain associated with the changed policies. In the example of FIG. 2, each domain may maintain its own policies as mentioned above. For example, the campus domain may maintain the SGTs identifying groups 116 associated with the campus domain such as a sales SGT 210 associate with a first group 116-1 (e.g., the sales group designated in Table 1) and a dev SGT 212 associated with a second group 116-2 (e.g., the dev group designated in Table 1).

Further, in the example of FIG. 2, the DC domain may maintain the EPGs identifying groups 116 associated with the DC domain such as a sales SGT 210 associated with a first group 116-1 (e.g., the sales group designated in Table 1) and a dev SGT 212 associated with a second group 116-2 (e.g., the dev group designated in Table 1). For example, the DC domain such as a first ACI data center 118-1 and a second ACI data center 118-2 may maintain a customer relationship management (CRM) EPG 214 and an EPG associated with a software development service EPG such as Github® EPG 216, respectively. The CRM EPG 214 and the Github® EPG 216 essentially serve as access control lists (ACLs) that define how a user within the EPG may, by way of policies, operate in a domain separate from it original domain. For example, the EPGs may define what specific users have access to specific applications executed within the first ACI data center 118-1 and the second ACI data center 118-2 and/or what specific data may be accessed within the first ACI data center 118-1 and the second ACI data center 118-2. Thus, the EPGs serve to enforce policies within a particular domain for a particular user or group of users. Thus, the example provided in Table 1, the sales group may have the designation of SGT-1 and EPG-2 while the dev group may have the designation of SGT-2 and EPG-3. These designations indicate a domain(s) that a specific user may utilize and the policies to be enforced as to that user for each of those domains.

The macro-segmentation depicted in FIG. 2 may occur as a first VN to VRF instance 124-1, a second VN to VRF instance 124-2, and so on. Further, the micro-segmentation process may be performed by the CDA controller 102 either concurrently or non-concurrently with the macro-segmentation. In addition to the micro-segmentation process described above, the micro-segmentation may include utilizing the CDA controller 102 and/or the PxGrid 114 to exchange SGT-to-EPG bindings between the CDA 102, the DNA center 104, the ISE 106, and the ACI controller 112.

As depicted in FIG. 2 in connection with numbers "5," "6," and "7," the enforcement of the policies at border nodes of the domains such as the DC domain and the campus domain, demilitarized zones (DMZs), firewalls, transit gateways, and other border devices may be accomplished based on the split policy matrices (e.g., the SGT policy matrix 204, the EPG policy matrix 206, and the group policy matrix 208).

With the ability to process communications within the network 100 through the above-described macro-segmentation process and the micro-segmentation process, the individual domain controllers may deploy the policies across their domains. The CDA controller 102, by providing the ability to have separate as well as unified policy through the merging and splitting of policies allows the domains to work with each other while maintaining their independence. Thus, the present systems and methods solve the restrictions posed by earlier solutions for both connectivity policies (VN/VRF) and group-based policies. The present systems and methods work in cases when the constructs are normalized in domains and also works equivalently well when the groups are distinct in each domains. This flexibility is provided by the CDA controller 102.

Figure 3:
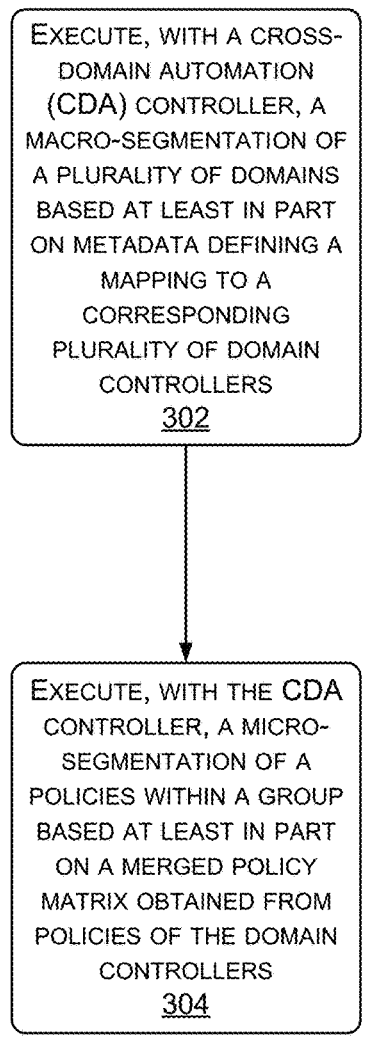
FIG. 3 illustrates a flow diagram of an example method for performing cross-domain policy orchestration, according to an example of the principles described herein.
Figure 4:
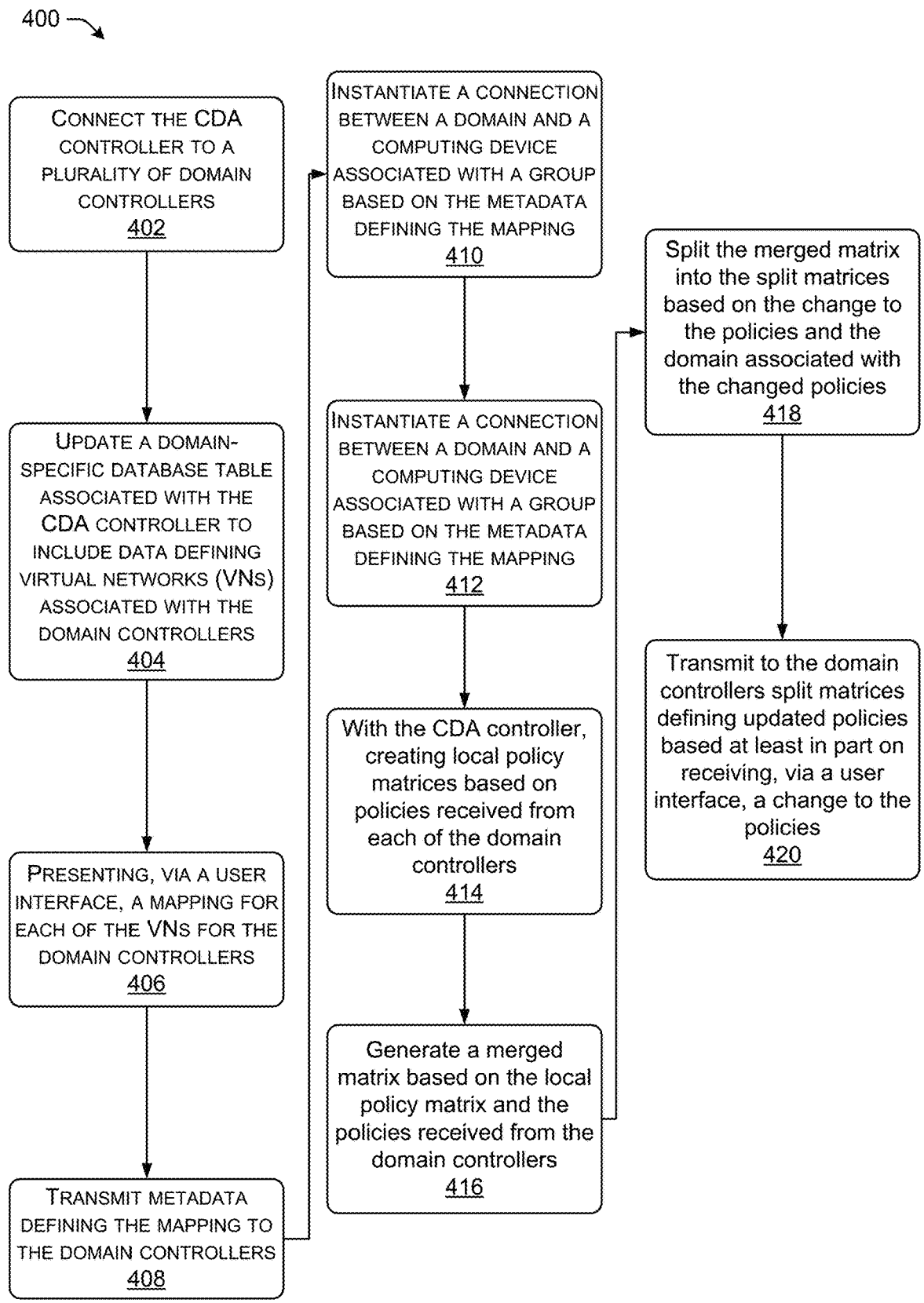
FIG. 4 illustrates a flow diagram of an example method for performing cross-domain policy orchestration, according to an example of the principles described herein.

FIGS. 3 and 4 illustrate flow diagrams of example methods 300 and 400 and that illustrate aspects of the functions performed at least partly by the network 100, the CDA controller 102, the DNA center 104, the ISE 106, the orchestrator 108, the attribute collector 110, the ACI controller 112, PxGrid 114, the computing devices or endpoints of the groups(s) 116, the ACI data center 118, and other devices as described in FIGS. 1 and 2. The logical operations described herein with respect to FIGS. 3 and 4 may be implemented (1) as a sequence of computer-implemented acts or program modules running on a computing system and/or (2) as interconnected machine logic circuits or circuit modules within the computing system. In one example, the method(s) 300 and 400 may be performed by a system comprising one or more processors and one or more non-transitory computer-readable media storing computer-executable instructions that, when executed by the one or more processors, cause the one or more processors to perform the method(s) 300 and 400.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3 and 4 and described herein. These operations may also be performed in parallel, or in a different order than those described herein. Some or all of these operations may also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for performing cross-domain policy orchestration, according to an example of the principles described herein. At 302, the method 300 may include executing, with the CDA controller 102, a macro-segmentation of a plurality of domains based at least in part on metadata defining a mapping to a corresponding plurality of domain controllers. The method 300 may further include executing, with the CDA controller 102, a micro-segmentation of policies within a group based at least in part on a merged policy matrix 202 obtained from policies of the domain controllers at 304.

FIG. 4 illustrates a flow diagram of an example method 400 for performing cross-domain policy orchestration, according to an example of the principles described herein. The method 400 of FIG. 4 provides further details of the method 300 of FIG. 3. The method 400 of FIG. 4 may include executing the macro-segmentation including connecting, at 402, the CDA controller 102 to a plurality of domain controllers (e.g., the DNA center 104, the ISE 106, the orchestrator 108, the attribute collector 110, the ACI controller 112, and other devices or controllers within the network 100 that are coupled to the CDA controller 102) associated with the corresponding domains (e.g., the campus domain, the WAN domain, the security domain, the DC (e.g., APIC) domain, the cloud domain, etc.).

At 404, the macro-segmentation process of the method 400 may further include updating a domain-specific database table associated with the CDA controller to include data defining VNs associated with the domain controllers. Further, at 406 of the method 400, the macro-segmentation process may further include presenting, via a user interface, a mapping for each of the VNs for the domain controllers, and, at 408, transmitting metadata defining the mapping to the domain controllers. The transmitting of the metadata defining the mapping to the domain controllers may include transmitting a VLAN-ID to the domain controllers. At 410, the macro-segmentation process of the method 400 may further include instantiating a connection between a domain and a computing device associated with a group based on the metadata defining the mapping.

At 412, the micro-segmentation process of the method 400 of FIG. 4 may include instantiating a connection between a domain and a computing device associated with a group 116 based on the metadata defining the mapping. At 414, the micro-segmentation process of the method 400 may further include, with the CDA controller 102, creating local policy matrices based on policies received from each of the domain controllers. In one example, the policies received from the domain controllers may be obtained from remote policy matrices of the domain controllers. The micro-segmentation process of the method 400 may further include generating the merged policy matrix 202 based on the local policy matrix and the policies received from the domain controllers at 416. In one example, the merged policy matrix 202 may be generated based at least in part on the groups being normalized across the domains or the mapping of the groups is provided by an administrator.

Further, at 418, the micro-segmentation process of the method 400 may include splitting the merged policy matrix 202 into the split policy matrices (e.g., the SGT policy matrix 204, the EPG policy matrix 206, and the group policy matrix 208) based on the change to the policies and the domain associated with the changed policies. At 420, the micro-segmentation process of the method 400 may further include transmitting to the domain controllers the split policy matrices (e.g., the SGT policy matrix 204, the EPG policy matrix 206, and the group policy matrix 208) defining updated policies based at least in part on receiving, via the user interface, a change to the policies.

Figure 5:
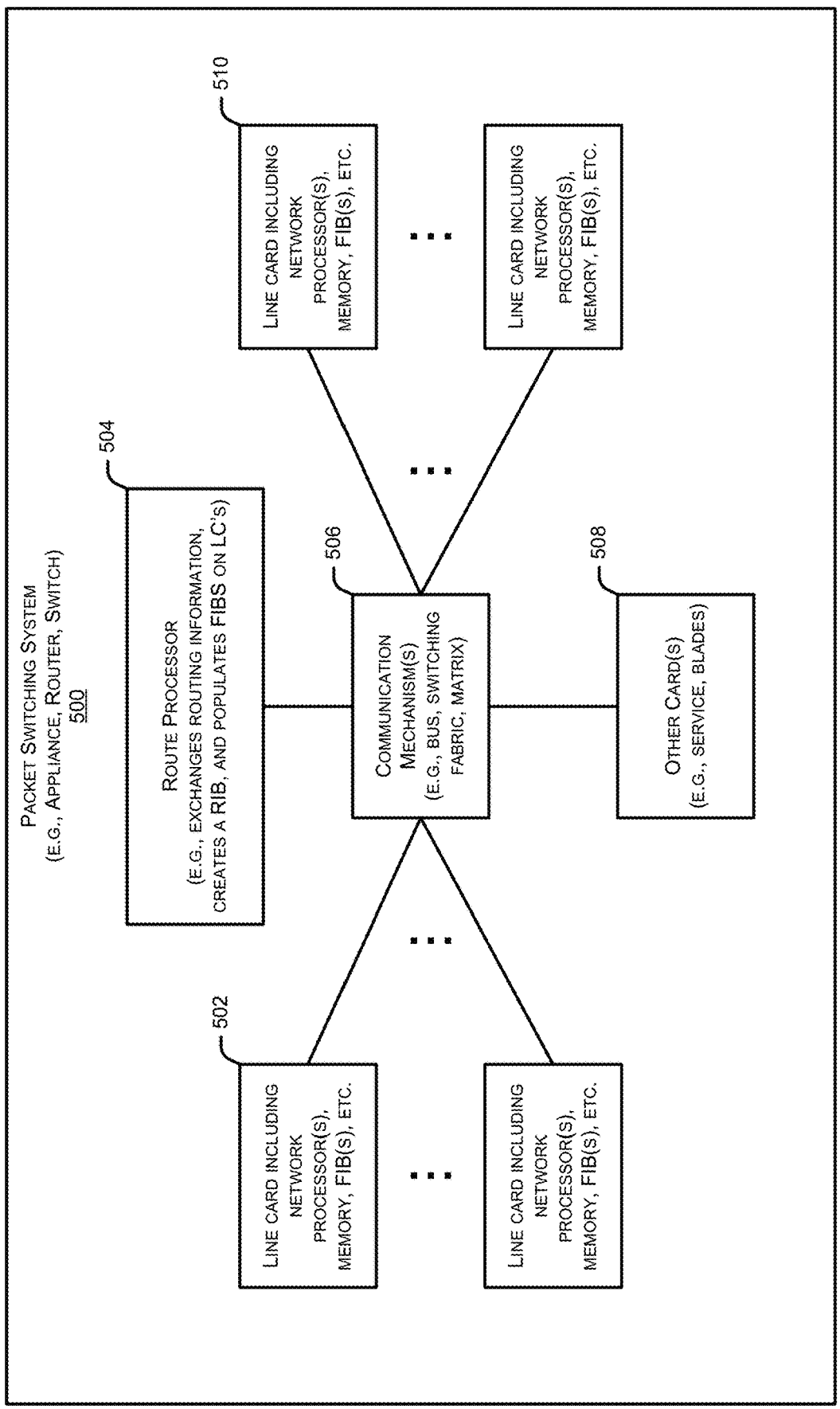
FIG. 5 illustrates a block diagram illustrating an example packet switching system that can be utilized to implement various aspects of the technologies disclosed herein.

FIG. 5 illustrates a block diagram illustrating an example packet switching device (or system) 500 that may be utilized to implement various aspects of the technologies disclosed herein. In one example, packet switching device(s) 500 may be employed in various networks, such as, for example, the network 100 as described with respect to FIGS. 1 and 2.

In one example, a packet switching device 500 may comprise multiple line card(s) 502, 510, each with one or more network interfaces for sending and receiving packets over communications links (e.g., possibly part of a link aggregation group). The packet switching device 500 may also have a control plane with one or more processing elements for managing the control plane and/or control plane processing of packets associated with forwarding of packets in the network 100. The packet switching device 500 may also include other cards 508 (e.g., service cards, blades) which include processing elements that are used to process (e.g., forward/send, drop, manipulate, change, modify, receive, create, duplicate, apply a service) packets associated with forwarding of packets in a network. The packet switching device 500 may comprise hardware-based communication mechanism 506 (e.g., bus, switching fabric, and/or matrix, etc.) for allowing its different entities 502, 504, 508 and 510 to communicate. Line card(s) 502, 510 may typically perform the actions of being both an ingress and/or an egress line card 502, 510, in regard to multiple other particular packets and/or packet streams being received by, or sent from, packet switching device 500.

Figure 6:
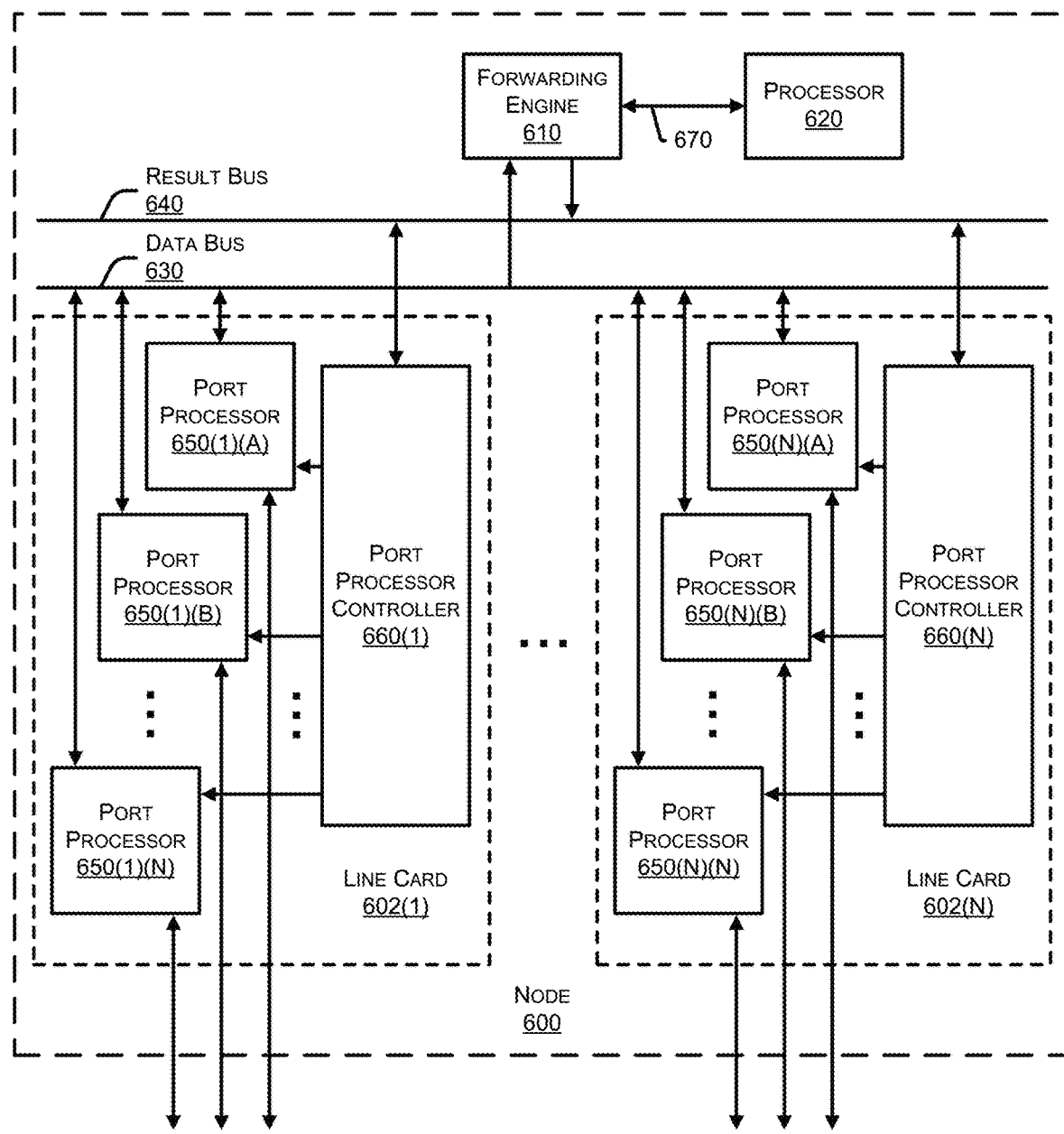
FIG. 6 illustrates a block diagram illustrating certain components of an example node that can be utilized to implement various aspects of the technologies disclosed herein.

FIG. 6 illustrates a block diagram illustrating certain components of an example node 600 that may be utilized to implement various aspects of the technologies disclosed herein. In one example, node(s) 600 may be employed in various networks, such as, for example, the network 100 as described with respect to FIGS. 1 and 2.

In one example, the node 600 may include any number of line cards 602 (e.g., line cards 602(1)-(N), where N may be any integer greater than 1) that are communicatively coupled to a forwarding engine 610 (also referred to as a packet forwarder) and/or a processor 620 via a data bus 630 and/or a result bus 640. The line cards 602(1)-(N) may include any number of port processors 650(1)(A)-(N)(N) which are controlled by port processor controllers 660(1)-(N), where N may be any integer greater than 1. Additionally, or alternatively, the forwarding engine 610 and/or the processor 620 are not only coupled to one another via the data bus 630 and the result bus 640 but may also communicatively coupled to one another by a communications link 670.

The processors (e.g., the port processor(s) 650 and/or the port processor controller(s) 660) of each line card 602 may be mounted on a single printed circuit board. When a packet or packet and header are received, the packet or packet and header may be identified and analyzed by node 600 (also referred to herein as a router) in the following manner. Upon receipt, a packet (or some or all of its control information) or packet and header may be sent from one of port processor(s) 650(1)(A)-(N)(N) at which the packet or packet and header was received and to one or more of those devices coupled to the data bus 630 (e.g., others of the port processor(s) 650(1)(A)-(N)(N), the forwarding engine 610 and/or the processor 620). Handling of the packet or packet and header may be determined, for example, by the forwarding engine 610. For example, the forwarding engine 610 may determine that the packet or packet and header should be forwarded to one or more of port processors 650(1)(A)-(N)(N). This may be accomplished by indicating to corresponding one(s) of port processor controllers 660 (1)-(N) that the copy of the packet or packet and header held in the given one(s) of port processor(s) 650(1)(A)-(N)(N) should be forwarded to the appropriate one of port processor(s) 650(1)(A)-(N)(N). Additionally, or alternatively, once a packet or packet and header has been identified for processing, the forwarding engine 610, the processor 620, and/or the like may be used to process the packet or packet and header in some manner and/or may add packet security information in order to secure the packet. On a node 600 sourcing such a packet or packet and header, this processing may include, for example, encryption of some or all of the packet's or packet and header's information, the addition of a digital signature, and/or some other information and/or processing capable of securing the packet or packet and header. On a node 600 receiving such a processed packet or packet and header, the corresponding process may be performed to recover or validate the packet's or packet and header's information that has been secured.

Figure 7:
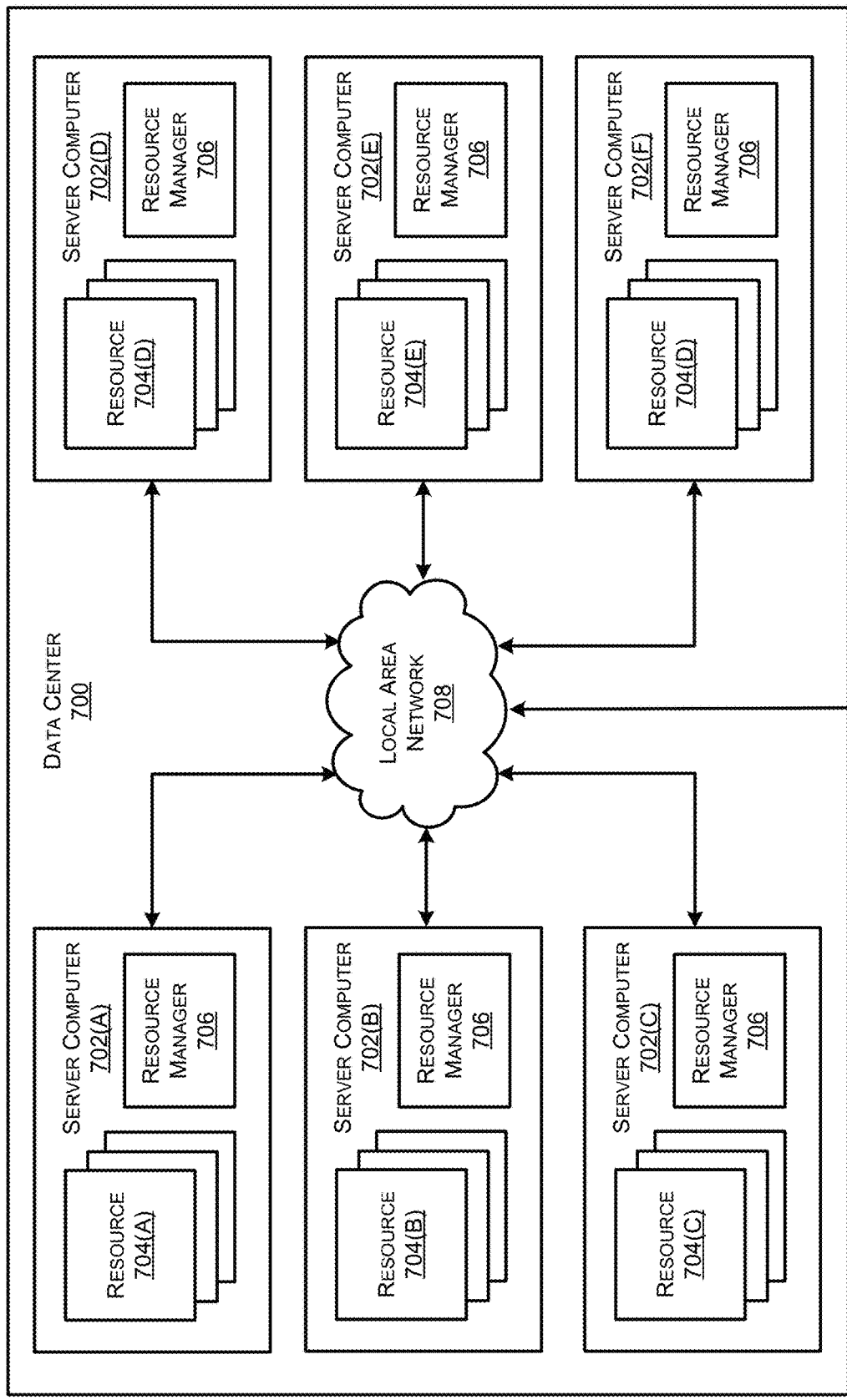
FIG. 7 illustrates a computing system diagram illustrating a configuration for a data center that can be utilized to implement aspects of the technologies disclosed herein.

FIG. 7 is a computing system diagram illustrating a configuration for a data center 700 that may be utilized to implement aspects of the technologies disclosed herein. The example data center 700 shown in FIG. 7 includes several server computers 702A-702F (which might be referred to herein singularly as "a server computer 702" or in the plural as "the server computers 702) for providing computing resources. In some examples, the resources and/or server computers 702 may include, or correspond to, any type of networked device described herein. Although described as servers, the server computers 702 may comprise any type of networked device, such as servers, switches, routers, hubs, bridges, gateways, modems, repeaters, access points, etc.

The server computers 702 may be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, virtual private networks (VPNs), and others. Some of the server computers 702 may also be configured to execute a resource manager 706 capable of instantiating and/or managing the computing resources. In the case of VM instances, for example, the resource manager 706 may be a hypervisor or another type of program configured to enable the execution of multiple VM instances on a single server computer 702. Server computers 702 in the data center 700 may also be configured to provide network services and other types of services.

In the example data center 700 shown in FIG. 7, an appropriate LAN 708 is also utilized to interconnect the server computers 702A-702F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 700, between each of the server computers 702A-702F in each data center 700, and, potentially, between computing resources in each of the server computers 702. It may be appreciated that the configuration of the data center 700 described with reference to FIG. 7 is merely illustrative and that other implementations may be utilized.

In some examples, the server computers 702 and or the computing resources 704 may each execute/host one or more tenant containers and/or virtual machines to perform techniques described herein.

In some instances, the data center 700 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 704 provided by the cloud computing network may include various types of computing resources, such as data processing resources like tenant containers and VM instances, data storage resources, networking resources, data communication resources, network services, VPN instances, and the like.

Each type of computing resource 704 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 704 not mentioned specifically herein.

The computing resources 704 provided by a cloud computing network may be enabled in one example by one or more data centers 700 (which might be referred to herein singularly as "a data center 700" or in the plural as "the data centers 700). The data centers 700 are facilities utilized to house and operate computer systems and associated components. The data centers 700 typically include redundant and backup power, communications, cooling, and security systems. The data centers 700 may also be located in geographically disparate locations. One illustrative example for a data center 700 that may be utilized to implement the technologies disclosed herein is described herein with regard to, for example, FIGS. 1 through 6.

Figure 8:
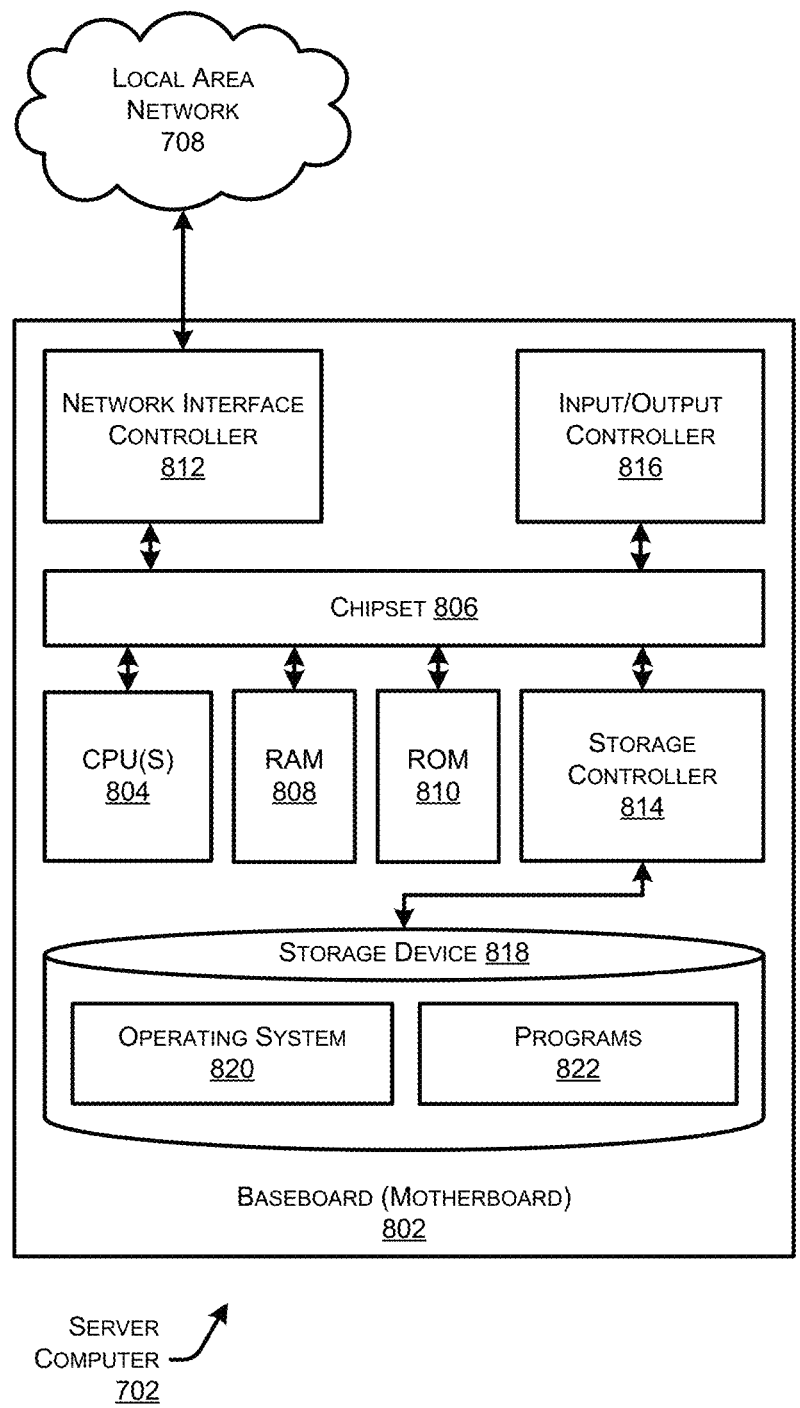
FIG. 8 is a computer architecture diagram showing an illustrative computer hardware architecture for implementing a server device that can be utilized to implement aspects of the various technologies presented herein.

FIG. 8 shows an example computer architecture for a computing device capable of executing program components for implementing the functionality described above. The computer architecture shown in FIG. 8 illustrates a conventional server computer, workstation, desktop computer, laptop, tablet, network appliance, e-reader, smartphone, or other computing device, and may be utilized to execute any of the software components presented herein. The server computer 702 may, in one example, correspond to a physical server of a data center, the packet switching system 500, and/or the node 700 described herein with respect to FIGS. 1, 2, 5, and 6, respectively.

The server computer 702 includes a baseboard 802, or "motherboard," which is a printed circuit board to which a multitude of components or devices may be connected by way of a system bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the server computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the server computer 702. The chipset 806 may further provide an interface to a computer-readable storage medium such as a read-only memory ("ROM") 810 or non-volatile RAM ("NVRAM") for storing basic routines that help to startup the server computer 702 and to transfer information between the various components and devices. The ROM 810 or NVRAM may also store other software components necessary for the operation of the server computer 702 in accordance with the configurations described herein.

The server computer 702 may operate in a networked environment using logical connections to remote computing devices and computer systems through a network, such as the LAN 708 depicted in FIGS. 7 and 8. The chipset 806 may include functionality for providing network connectivity through a NIC 812, such as a gigabit Ethernet adapter. The NIC 812 is capable of connecting the server computer 702 to other computing devices over the network 708. It should be appreciated that multiple NICs 812 may be present in the server computer 702, connecting the computer to other types of networks and remote computer systems.

The server computer 702 may be connected to a storage device 818 that provides non-volatile storage for the server computer 702. The storage device 818 may store an operating system 820, programs 822, and data, which have been described in greater detail herein. The storage device 818 may be connected to the server computer 702 through a storage controller 814 connected to the chipset 806. The storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 702 may store data on the storage device 818 by transforming the physical state of the physical storage units to reflect the information being stored. The specific transformation of physical state may depend on various factors, in different embodiments of this description. Examples of such factors may include, but are not limited to, the technology used to implement the physical storage units, whether the storage device 818 is characterized as primary or secondary storage, and the like.

For example, the server computer 702 may store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 702 may further read information from the storage device 818 by detecting the physical states or characteristics of one or more particular locations within the physical storage units.

In addition to the mass storage device 818 described above, the server computer 702 may have access to other computer-readable storage media to store and retrieve information, such as program modules, data structures, or other data. It should be appreciated by those skilled in the art that computer-readable storage media is any available media that provides for the non-transitory storage of data and that may be accessed by the server computer 702. In one example, the operations performed by the network 100, and or any components included therein, may be supported by one or more devices similar to server computer 702. Stated otherwise, some or all of the operations performed by the network 100, and or any components included therein, may be performed by one or more server computer 702 operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 818 may store an operating system 820 utilized to control the operation of the server computer 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX operating system or one of its variants. It should be appreciated that other operating systems may also be utilized. The storage device 818 may store other system or application programs and data utilized by the server computer 702.

In one embodiment, the storage device 818 or other computer-readable storage media is encoded with computer-executable instructions which, when loaded into the server computer 702, transform the computer from a general-purpose computing system into a special-purpose computer capable of implementing the embodiments described herein. These computer-executable instructions transform the server computer 702 by specifying how the CPUs 804 transition between states, as described above. According to one embodiment, the server computer 702 has access to computer-readable storage media storing computer-executable instructions which, when executed by the server computer 702, perform the various processes described above with regard to FIGS. 1 through 7. The server computer 702 may also include computer-readable storage media having instructions stored thereupon for performing any of the other computer-implemented operations described herein.

The server computer 702 may also include one or more input/output controllers 816 for receiving and processing input from a number of input devices, such as a keyboard, a mouse, a touchpad, a touch screen, an electronic stylus, or other type of input device. Similarly, an input/output controller 816 may provide output to a display, such as a computer monitor, a flat-panel display, a digital projector, a printer, or other type of output device. It will be appreciated that the server computer 702 might not include all of the components shown in FIG. 8, may include other components that are not explicitly shown in FIG. 8, or might utilize an architecture completely different than that shown in FIG. 8.

CONCLUSION

The examples described herein provide a network that provides a macro-segmentation process and a micro-segmentation process where, the individual domain controllers may deploy the policies across their domains. The CDA controller 102, by providing the ability to have separate as well as unified policy through the merging and splitting of policies allows the domains to work with each other while maintaining their independence. Thus, the present systems and methods solve the restrictions posed by earlier solutions for both connectivity policies (VN/VRF) and group-based policies. The present systems and methods work in cases when the constructs are normalized in domains and also works equivalently well when the groups are distinct in each domains. This flexibility is provided by the CDA controller 102.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of cross-domain policy orchestration, comprising:
   executing, with a cross-domain automation (CDA) controller, a macro-segmentation of a plurality of domains based at least in part on determining mappings between individual domain controllers associated with the plurality of domains, the mappings comprising metadata enabling communication between the individual domain controllers;
   creating, by the CDA controller, a local policy matrix based on policies of individual domains received from the individual domain controllers;
   generating a merged policy matrix based on the local policy matrix and the policies received from the individual domain controllers; and
   executing, with the CDA controller, a micro-segmentation of particular policies associated with one or more groups across the plurality of domains based at least in part on the merged policy matrix.

2. The method of claim 1, wherein executing the macro-segmentation comprises:
   connecting the CDA controller to the individual domain controllers of a plurality of domain controllers;
   updating a domain-specific database table associated with the CDA controller to include data defining virtual networks (VNs) associated with the individual domain controllers;
   presenting, via a user interface, a mapping for each of the VNs for the individual domain controllers; and
   transmitting the metadata defining the mapping to the individual domain controllers.

3. The method of claim 2, further comprising instantiating a connection between a domain and a computing device associated with a group based on the metadata defining the mapping.

4. The method of claim 2, wherein transmitting the metadata defining the mapping to the individual domain controllers comprises transmitting a virtual local area network (VLAN) identification (ID) to the individual domain controllers.

5. The method of claim 1, wherein executing the micro-segmentation comprises:
   transmitting to the individual domain controllers split policy matrices defining updated policies based at least in part on receiving, via a user interface, a change to the policies.

6. The method of claim 5, further comprising splitting the merged policy matrix into the split policy matrices based on the change to the policies and a domain associated with the updated policies.

7. The method of claim 1, wherein the merged policy matrix is generated based at least in part on the one or more groups being normalized across the plurality of domains or the mappings of the one or more groups is provided by an administrator.

8. The method of claim 1, wherein the policies received from the individual domain controllers are obtained from remote policy matrices of the individual domain controllers.

9. A non-transitory computer-readable medium storing instructions that, when executed, causes a processor to perform operations, comprising:
   executing, with a cross-domain automation (CDA) controller, a macro-segmentation of a plurality of domains based at least in part on metadata defining a mapping to a plurality of domain controllers;

creating, by the CDA controller, a local policy matrix based on policies received from individual domain controllers of the plurality of domain controllers;

generating a merged policy matrix based on the local policy matrix and the policies received from the plurality of domain controllers; and executing, with the CDA controller, a micro-segmentation of particular policies within a group based at least in part on the merged policy matrix.

10. The non-transitory computer-readable medium of claim 9, wherein executing the macro-segmentation comprises:

connecting the CDA controller to the plurality of domain controllers;

updating a domain-specific database table associated with the CDA controller to include data defining virtual networks (VNs) associated with the individual domain controllers;

presenting, via a user interface, a mapping for each of the VNs for the individual domain controllers; and transmitting the metadata defining the mapping to the individual domain controllers.

11. The non-transitory computer-readable medium of claim 10, the operations further comprising instantiating a connection between a domain and a computing device associated with the group based on the metadata defining the mapping.

12. The non-transitory computer-readable medium of claim 10, wherein transmitting the metadata defining the mapping to the individual domain controllers comprises transmitting a virtual local area network (VLAN) identification (ID) to the individual domain controllers.

13. The non-transitory computer-readable medium of claim 9, wherein executing the micro-segmentation further comprises:

transmitting to the individual domain controllers, split policy matrices defining updated policies based at least in part on receiving, via a user interface, a change to the policies.

14. The non-transitory computer-readable medium of claim 13, the operations further comprising splitting the merged policy matrix into the split policy matrices based on the change to the policies and a domain associated with the updated policies.

15. The non-transitory computer-readable medium of claim 13, wherein the policies received from the individual domain controllers are obtained from remote policy matrices of the individual domain controllers.

16. A cross-domain automation (CDA) controller comprising:

a processor; and a non-transitory computer-readable media storing instructions that, when executed by the processor, causes the processor to perform operations comprising:

receiving, from a plurality of domain controllers associated with a plurality of domains, data including virtual network (VN) data associated with individual domain controllers;

determining, based on the data, mappings between the individual domain controllers, the mappings comprising metadata enabling communication between the individual domain controllers;

executing, with the CDA controller, a macro-segmentation of the plurality of domains based at least in part on sending the mappings to the plurality of domain controllers;

creating, by the CDA controller, a local policy matrix based on policies received from individual domain controllers of the plurality of domain controllers;

generating a merged policy matrix based on the local policy matrix and the policies received from the plurality of domain controllers; and executing a micro-segmentation of particular policies within a group based at least in part on a merged policy matrix obtained from the policies of the plurality of domain controllers.

17. The CDA controller of claim 16, wherein executing the macro-segmentation comprises:

connecting to the plurality of domain controllers;

updating a domain-specific database table associated with the CDA controller to include the data, the VN data defining one or more VNs associated with the individual domain controllers;

presenting, via a user interface, a mapping for each of the VNs for the individual domain controllers;

transmitting the metadata defining the mapping to the individual domain controllers; and instantiating a connection between a domain and a computing device associated with the group based on the metadata defining the mapping.

18. The CDA controller of claim 17, wherein the metadata further comprises a virtual local area network (VLAN) identification (ID) to the individual domain controllers.

19. The CDA controller of claim 17, wherein executing the micro-segmentation comprises:

creating a local policy matrix based on the policies received from the individual domain controllers;

generating the merged policy matrix based on the local policy matrix and the policies;

splitting the merged policy matrix into split policy matrices based on a change to the policies and a domain associated with the change; and transmitting, to the individual domain controllers, the split policy matrices defining updated policies based at least in part on receiving, via a user interface, the change to the policies.

20. The CDA controller of claim 19, wherein the policies received from the individual domain controllers are obtained from remote policy matrices of the individual domain controllers.

* * * * *